United States Patent

Sakai

[11] Patent Number: 5,510,593
[45] Date of Patent: Apr. 23, 1996

[54] METHOD AND APPARATUS FOR SEPARATING A TEMPERATURE-ADHERED ELECTRODE TIP

[75] Inventor: Hirohisa Sakai, Higashiura, Japan

[73] Assignee: Toyota Jidosha Kabushiki Kaisha, Toyota, Japan

[21] Appl. No.: 328,529

[22] Filed: Oct. 25, 1994

[30] Foreign Application Priority Data

Oct. 27, 1993 [JP] Japan ................................ 5-268650

[51] Int. Cl.⁶ ........................... B23K 37/02; B23K 11/22; B25J 11/00
[52] U.S. Cl. ........................... 219/86.7; 219/91.2; 901/42
[58] Field of Search ........................... 219/86.25, 86.31, 219/86.33, 86.41, 86.51, 86.7, 91.2, 117.1; 901/42

[56] References Cited

U.S. PATENT DOCUMENTS

| | | |
|---|---|---|
| 5,221,037 | 6/1993 | Terakado et al. . |
| 5,285,525 | 2/1994 | Nagao et al. ................ 395/87 |
| 5,340,960 | 8/1994 | Takasaki et al. ................ 219/86.7 |

FOREIGN PATENT DOCUMENTS

| | | |
|---|---|---|
| 0424190 | 4/1991 | European Pat. Off. . |
| 3047913 | 7/1982 | Germany . |
| 299519 | 4/1992 | Germany . |
| 57-56178 | 4/1982 | Japan . |
| 1215476 | 8/1989 | Japan . |
| 1299784 | 12/1989 | Japan . |
| 4-100697 | 4/1992 | Japan . |
| 5261560 | 10/1993 | Japan . |
| 2261081 | 5/1993 | United Kingdom . |

OTHER PUBLICATIONS

Patent Abstracts of Japan, vol. 10, No. 381, 19 Dec. 1986.
Patent Abstracts of Japan, vol. 6, No. 130, 16 Jul. 1982.

*Primary Examiner*—Teresa J. Walberg
*Assistant Examiner*—J. Pelham
*Attorney, Agent, or Firm*—Cushman, Darby & Cushman

[57] ABSTRACT

A method for separating a temperature-adhered electrode tip from a workpiece wherein the electrode tip is biased in a direction away from the workpiece and a separation force is imposed on the electrode tip while the biasing force is being imposed so that a defect is not caused in the workpiece when the electrode tip or the workpiece is moved relative to the other during and/or after separation. An apparatus wherein a condenser battery is disposed in an electrical circuit including a welding gun servo motor. An apparatus wherein an electrode tip rotating device is installed in the welding gun.

7 Claims, 11 Drawing Sheets

F I G. 2
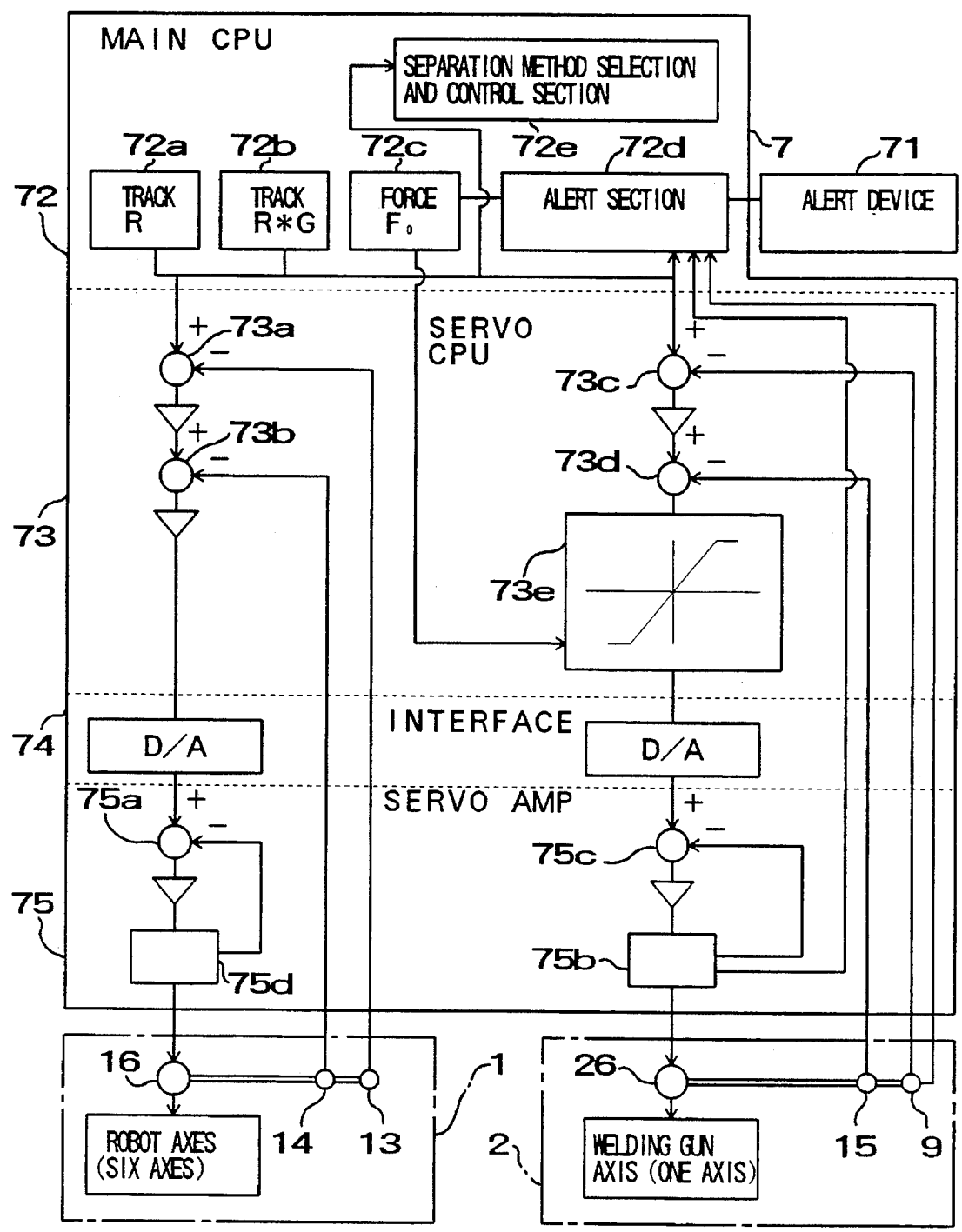

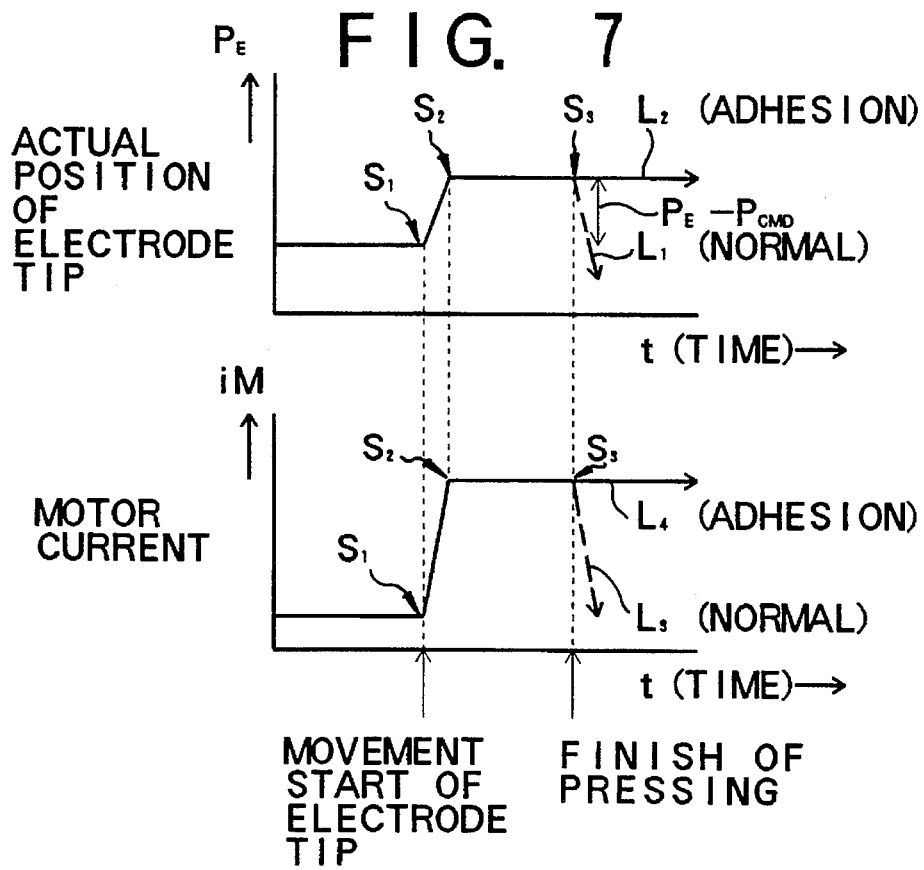
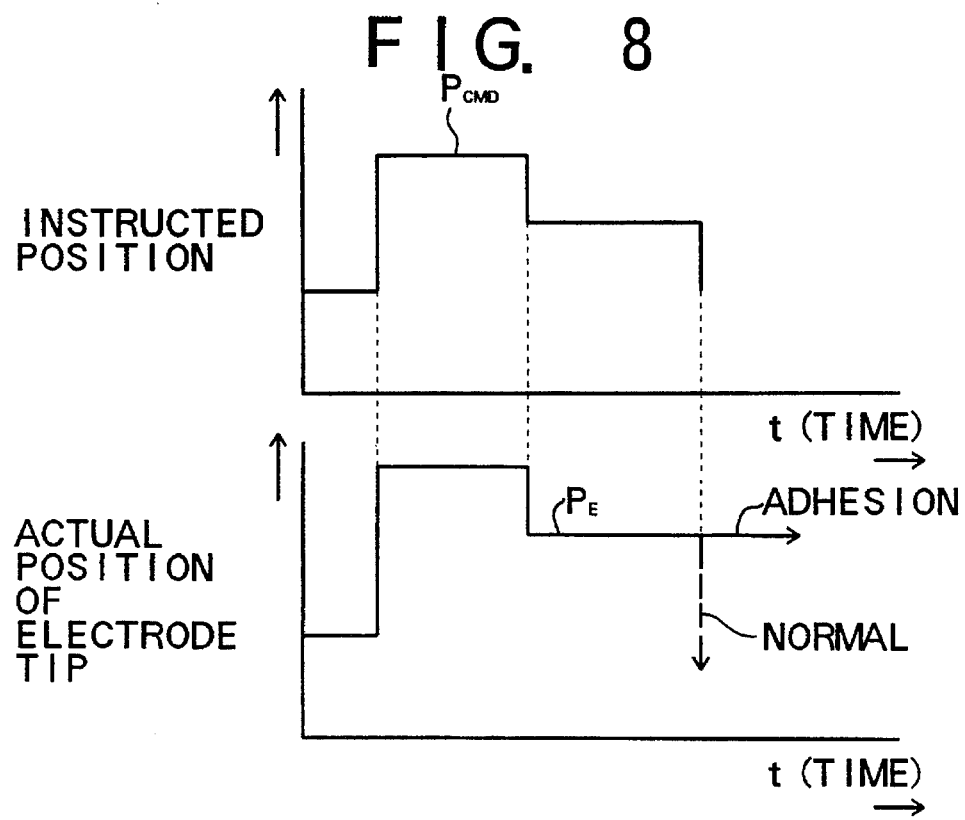

FROM STEP 60

TO STEP 63

METHOD AND APPARATUS FOR SEPARATING A TEMPERATURE-ADHERED ELECTRODE TIP

BACKGROUND OF THE INVENTION

1. Field of the Invention

The present invention relates to a method and apparatus for separating a welding electrode tip from a workpiece when the electrode tip has temperature adhered the workpiece.

2. Description of the Prior Art

Automobile body panels are spot welded using a welding apparatus which includes a general purpose robot having six degrees of freedom and a spot-welding gun coupled to a wrist portion of the robot. The conventional spot-welding gun pressurizes a workpiece between a pair of electrode tips by reciprocally moving one of the electrode tips by an air cylinder. By comparison, a servo-welding gun having a pair of electrode tips, one of which is driven by a servo motor, was proposed by the present applicant in Japanese Patent Application No. 4-94916 filed on Mar. 23, 1992.

When temperature adhesion has occurred between an electrode tip and a workpiece, a worker after recognizing the temperature adhesion enters the welding area to hammer the adhering portion of the electrode tip free from the workpiece. In the case of a welding gun operated by an air cylinder, remaining air pressure continues to bias the electrode tip in a direction away from the workpiece. Consequently, the workpiece will not be injured when the hammered electrode tip is forced to move relative to the workpiece. In the case of a servo-welding gun, however, the servo-welding gun and a robot are automatically powered off when the worker enters the welding area. Therefore, no biasing force acts on the electrode tip in a direction away from the workpiece, and the electrode tip continues to contact the workpiece. Consequently, the workpiece will be injured when the hammered electrode tip is moved laterally relative to the workpiece.

SUMMARY OF THE INVENTION

An object of the present invention is to provide a method and apparatus for separating a temperature-adhered electrode tip of a servo-welding gun from a workpiece without causing a defect to the workpiece when electrode tip and the workpiece are moved relative to each other.

Another object of the present invention is to provide a method and apparatus for automatically separating an electrode tip of a servo-welding gun from a workpiece when a temperature-adhered electrode tip has bee detected.

BRIEF DESCRIPTION OF THE DRAWINGS

The above and other objects, features, and advantages of the present invention will become more apparent and will be more readily appreciated from the following detailed description of the preferred embodiments of the present invention taken in conjunction with the accompanying drawings, in which:

FIG. 2 is a control system diagram of a spot welding control apparatus applicable to any embodiment of the present invention;

FIG. 7 is a graphical representation illustrating changes in an electrode tip position and a servo motor electric current with respect to elapsed time, applicable to any embodiment of the present invention;

FIG. 8 is a diagram comparing an instructed position and an actual position of an electrode tip, applicable to any embodiment of the present invention;

DETAILED DESCRIPTION OF THE PREFERRED EMBODIMENTS

Figure 1:
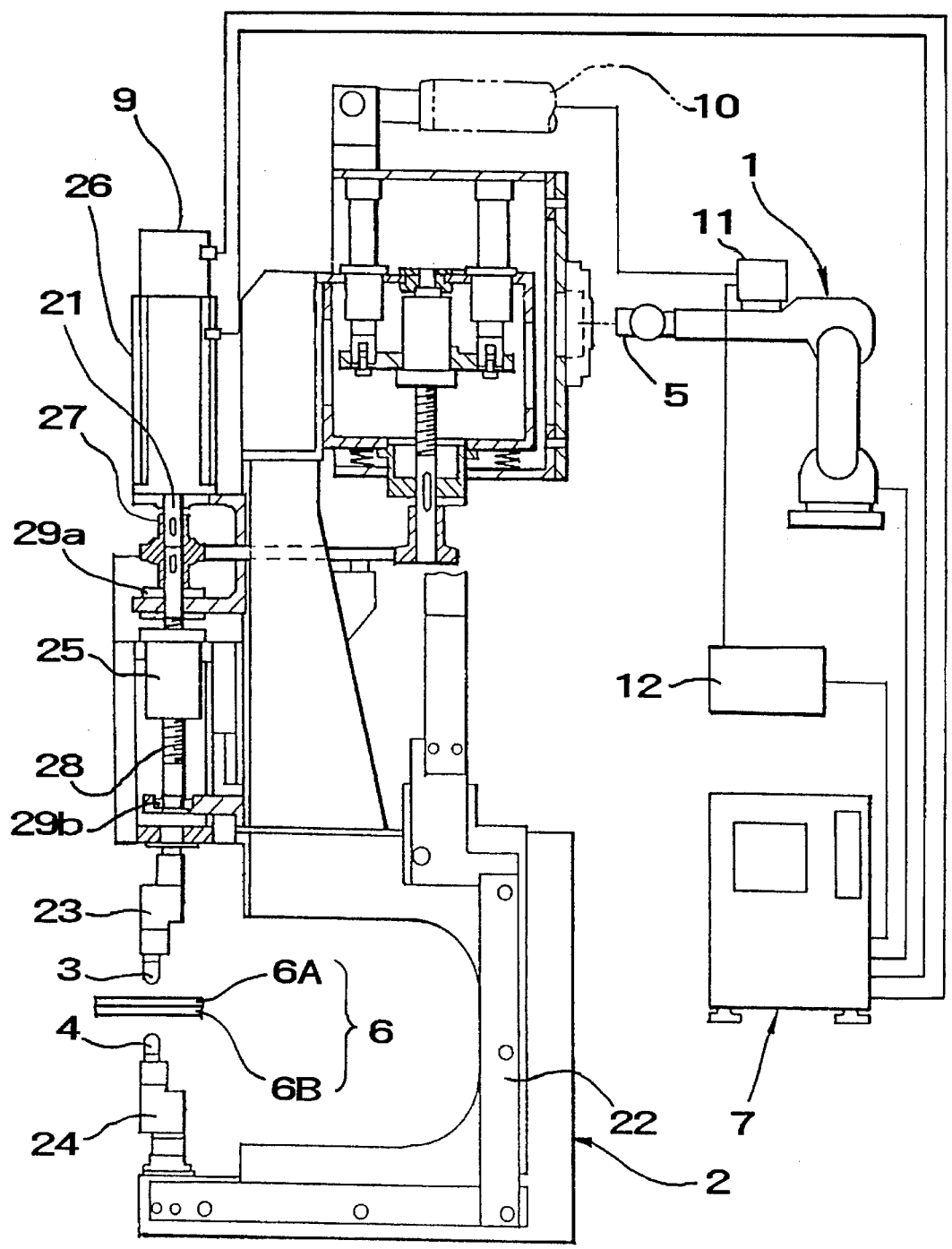
FIG. 1 is an enlarged cross-sectional view of a servo-welding gun accompanied by a schematic system diagram of a welding robot, applicable to any embodiment of the present invention.

The present invention includes four embodiments. Throughout all descriptions of the embodiments of the present invention, portions having common or similar structures are denoted with the same reference numerals.

First, structures and operation thereof common to all of the embodiments of the present invention will be explained with reference to FIGS. 1 to 10.

Figure 4:
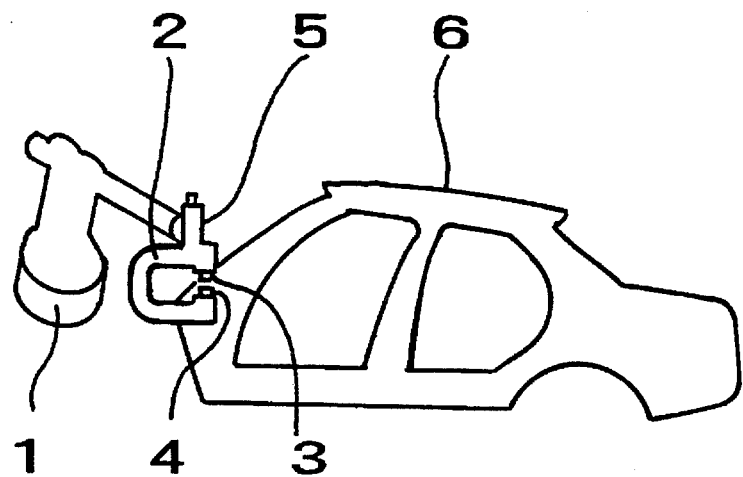
FIG. 4 is an oblique view of an automobile body to which spot welding is applied.
Figure 5:
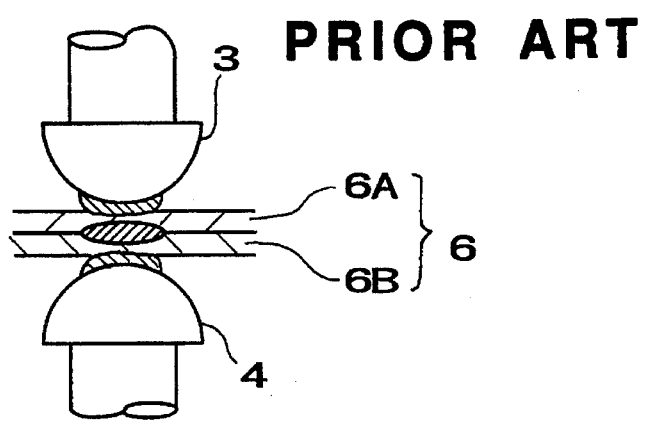
FIG. 5 is an elevational view of electrode tips temperature adhering to a workpiece in a prior art.

As illustrated in FIG. 4, spot welding of a workpiece 6, for example, an automobile body, is conducted at welding points using a welding robot 1. A servo-welding gun 2 is coupled to a wrist portion 5 of the welding robot 1. The welding gun 2 has a pair of electrode tips 3 and 4, one of which is driven by a servo motor 26. The pair of electrode tips 3 and 4 holds the workpiece 6 by pressing the workpiece 6 therebetween and then spot welds the workpiece 6 by pressing an electric current between the electrode tips 3 and 4.

Figure 3:
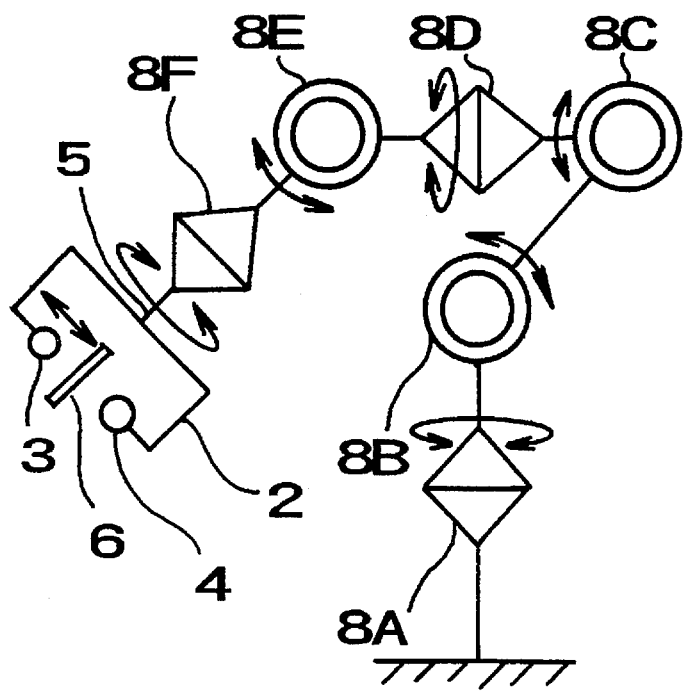
FIG. 3 is a schematic skeleton view of a general purpose robot having six degrees of freedom, to which a wrist portion of a welding gun is coupled.

As illustrated in FIG. 3, the welding robot 1 is a general purpose robot having six degrees of freedom, for example, six articulations 8A to 8F. By controlling the rotational angles of the six articulations, the wrist portion 5 and the welding gun 2 can be moved to any position (x, y, z) and any attitude ($\theta_x$, $\theta_y$, $\theta_z$) desired. The welding gun 2 is controlled by a control unit 7 (FIG. 1). The welding points are programmed in the control unit 7. Once programmed, the control unit 7 moves the welding gun 2 to the programmed points to perform spot welding.

As illustrated in FIG. 1, the welding gun 2 has a generally C-shaped framework 22. A tip holder 24 is coupled to one leg portion of the C-shaped framework 22 and holds an electrode tip 4. The welding gun servo motor 26 is connected to the other leg portion. A threaded rod 28 of a ball screw coupling is coupled to rotational shaft 21 of the servo motor 26 via a coupling 27. The threaded rod 28 is supported rotatably by bearings 29a and 29b which are connected to the C-shaped framework 29. A nut 25 is coupled rotatably to the threaded rod 28 via ball elements of the ball screw coupling so that the nut 25 is moved in an axial direction of the threaded rod 28 by powering the servo motor 26 and rotating the threaded rod 28. Another tip holder 23, connected to the electrode tip 3, is coupled to the nut 25 via a connecting member. Thus, the electrode tip 3 is moved by operating the servo motor 26.

An encoder 9 is interlaced to the servo motor 26 and detects the rotational angle of the servo motor 26. With such data, the position of the electrode tip 3 along the threaded rod 28 can be determined. An output of the data from the encoder 9 is fed to the control unit 7. The axial position of the electrode tip 3 may be detected by devices other than the encoder, for example, a linear motor.

The electrode tips 3 and 4 are connected electrically to a welding transformer 11 via a cable 10. In turn, the welding transformer 11 is connected electrically to a welding power source (not shown) via a controller 12 having a timer function. The controller 12 is connected electrically then to the control unit 7 so that a welding time period in accordance with the timer function is controlled by the control unit 7.

As illustrated in FIG. 2, the control unit 7 includes a main CPU (central processing unit) 72, a servo CPU 73, an interface 74, a servo amplifier 75, and an alert device 71. The main CPU 72 includes a first raceway track section 72a for calculating and indicating a raceway track position R of the wrist 5 of the welding robot 1, a second raceway track section 72b for calculating and indicating a raceway track position, R*G, of the electrode tip 3, a pressure force section 72c for calculating a pressure force for the electrode tip 3, an alert section 72d for determining whether or not an abnormal weld condition (i.e., temperature adhesion) has occurred, and a separation method selection and control section 72e for selecting a suitable separation routine and conducting the selected routine. The alert section 72d is linked to the separation method selection and control section 72e and outputs to the alert device 71. When the alert section 72d determines that a temperature adhesion has occurred, the alert device 71 expresses the occurrence of the temperature adhesion.

The servo CPU 73 includes two sections 73a and 73b for calculating differentials between (a) instruction or control values for a position and a speed of the robot wrist 5 sent from the first raceway track section 72a and (b) actual values for a position and a speed of the robot wrist 5 as reported by a positional sensor 13 and a speed sensor 14 coupled to each servo motor 16 of each welding robot articulation 8A to 8F. Servo CPU sections 73a and 73b also control each servo motor 16 so that the above differentials become zero.

Similarly, the servo CPU 73 further includes sections 73c and 73d for calculating differentials between (a) instruction or control values for a position and a speed of the electrode tip 3 sent from the second raceway track section 72b and (b) actual values for a position and a speed of the electrode tip 3 as reported by the encoder 9 and the speed sensor 15. Sections 73c and 73d also control the servo motor 26 so that the above differentials become zero.

Further, the servo CPU 73 includes a section 73e for comparing an actual pressure force value calculated from an actual electric current of the servo motor 26 with an instruction pressure force value sent from the main CPU 72, and for controlling the actual pressure force to become equal to the instruction pressure force.

The interface 74 includes a digital/analogue converter for converting a digital signal from the servo CPU 73 to an analogue signal. The servo amplifier 75 includes a section 75d for detecting an electric current flowing in each servo motor 16 and a section 75a for controlling the electric current of the servo motor 16 based on a differential between the detected actual electric current and an instruction electric current for the servo motor 16. Similarly, the servo amplifier 75 includes an electric current detecting sensor 75b for detecting an electric current flowing in the servo motor 26 for moving the electrode tip 3, and a portion 75c for controlling the electric current of the servo motor 26 based on a differential between an actual electric current value fed back from the sensor 75b and an instruction value.

Based upon the foregoing description, methods and apparatus for detecting temperature adhesion and controlling separation will be described generally for all embodiments.

A signal from the electric current detecting sensor 75b and a signal from the encoder 9 representing position are fed to the alert section 72d of the main CPU 72. Based on these inputs, the alert section 72d determines whether a temperature adhesion has occurred. When the section 72d determines that a temperature adhesion has occurred, it sends a signal to the alert device 71 which in turn annunciates the occurrence of the temperature adhesion. The section 72d also sends the signal to the separation method selection and control section 72e. Thereafter, the selectional control section 72e selects a separation control routine from control routines (routines of four embodiments of the present invention) stored in a RAM of the control unit 7 and controls the selected separation method.

The alert section 72d is illustrated in FIGS. 5 to 8. In the prior art, as shown in FIG. 8, temperature adhesion of the electrode tip 3 to the workpiece 6 including panels 6A and 6B is visually determined. However, automatic detection for temperature adhesion is desirable. In the present invention, after spot welding, a differential between an instruction position $P_{CMD}$ and an actual position $P_E$ for the servo motor 26, and an actual electric current iM of the servo motor 26 are monitored. When the above differential ($P_E$- $P_{CMD}$) exceeds a first threshold $P_{THR}$ and the servo motor electric current iM exceeds a second threshold $iM_{THR}$, temperature adhesion of the electrode tips 3 and 4 with the workpiece 6 has occurred. Then, the temperature adhesion occurrence is then indicated by the alert device 71. Additionally, it is possible to detect the temperature adhesion by monitoring a differential between the actual position $P_E$ with the instructed position $P_{CMD}$ alone, without necessarily checking the electrical current iM.

Figure 6:
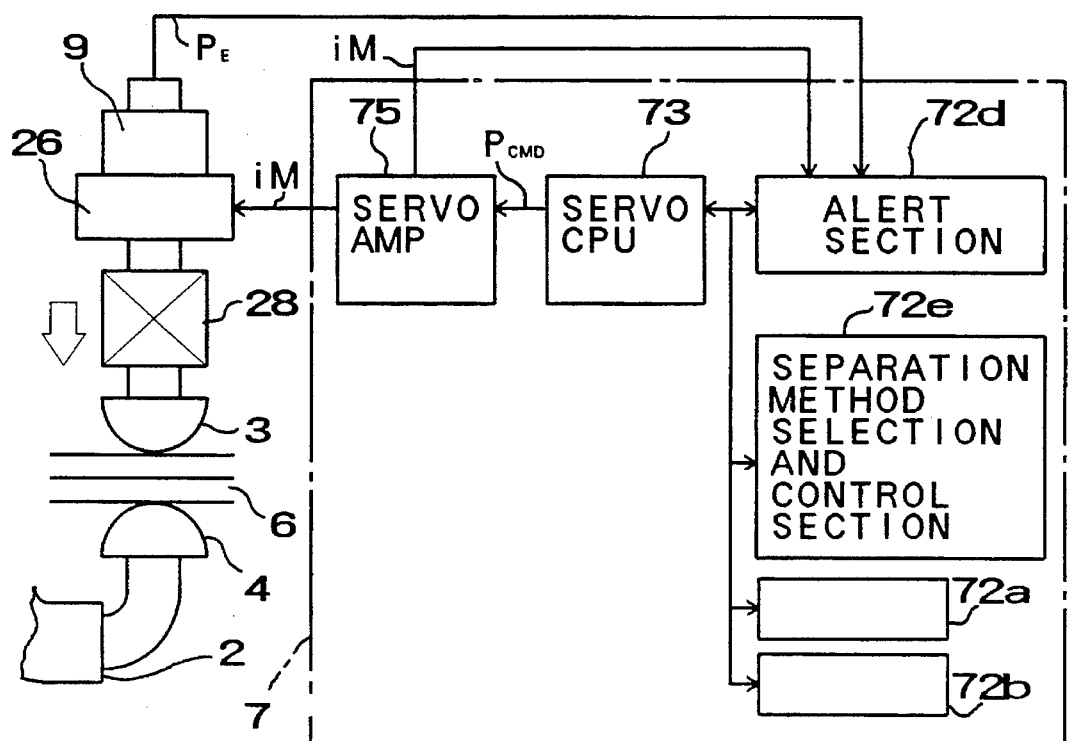
FIG. 6 is a schematic control system diagram of a servo welding gun applicable to any embodiment of the present invention.

More particularly, as illustrated in FIG. 6, the alert section 72d is installed in the main CPU 72. A signal $P_E$ from the encoder 9, and a singal iM from the electric current detecting sensor 75b are reported to the alert section 72d. Further, the instruction position $P_{CMD}$ of the electrode tip sent from the raceway track sections 72a and 72b of the main CPU 72 is reported also to the alert section 72d.

FIG. 7 illustrates corresponding changes in the actual position $P_E$ of the electrode tip 3 and the actual electric current iM of the servo motor 26 in a case when temperature adhesion occurs. At point $S_1$, the electrode tip 3 begins to move toward the workpiece 6 and thereafter comes into contact with the workpiece 6 at point $S_2$. Then, between points $S_2$ and $S_3$, a welding current flows between the pair of electrode tips 3 and 4 so that the workpiece 6 is spot welded. The electrode tip 3 begins to move away from the workpiece 6 at point $S_3$. In a normal condition where no temperature adhesion occurs, as illustrated by dotted line $L_1$ (instructed position $P_{CMD}$), the electrode tip 3 can move away from the workpiece 6. In an abnormal condition where temperature adhesion occurs, however, as illustrated by full line $L_2$, the electrode tip 3 cannot move away from the workpiece 6. The distance between $L_1$ and $L_2$ shows a differential between $P_E$ and $P_{CMD}$, the actual and instructed position of the electrode tip 3. Further, in a case where no temperature adhesion has occurred, the actual electric current of the servo motor 26 decreases, as shown by dotted line $L_3$, when the electric tip 3 moves away from the workpiece 6 after spot welding. In contrast, in a case where temperature adhesion has occurred, the electric current of the serve meter 26 remains constant as shown by full line $L_4$. Therefore, any differential between $P_E$ and $P_{CMD}$ and/or the electric current iM above a threshold indicates temperature adhesion. FIG. 8 illustrates that a temperature adhesion can be detected by the differential between $P_E$ and $P_{CMD}$ only.

Figure 9:
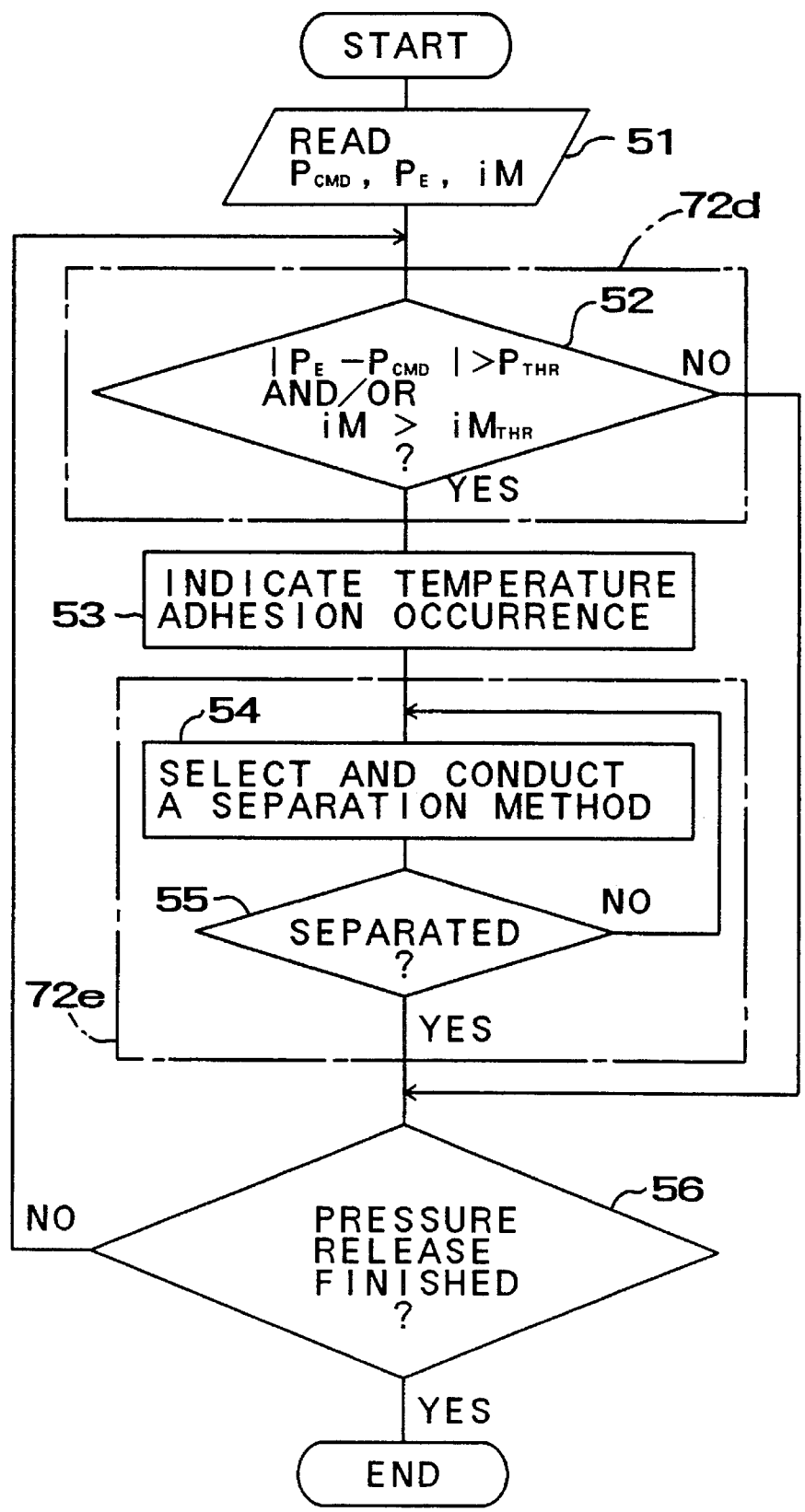
FIG. 9 is a flow chart of a control routine for detecting occurrences of temperature adhesion between an electrode tip and a workpiece and a control routine for selecting and conducting a temperature-adhered electrode tip separating method, applicable to any embodiment of the present invention.

FIG. 9 illustrates a control routine for automatically detecting a temperature adhesion and successively selecting and conducting a separation method. This control routine is cycled at small time intervals. At step 51, an instruction position $P_{CMD}$ of the electrode tip 3 sent from the second raceway section 72b, an actual position $P_E$ from the encoder 9, and an actual servo motor electric current iM from the electric current detecting sensor 75b are retrieved. Then, at step 52, the control routine determines whether a differential between $P_E$ and $P_{CMD}$ exceeds a first threshold $P_{THR}$ and/or whether the actual electric current iM exceeds a second threshold $iM_{THR}$. The step 52 forms the alert section 72d as a combination of a position differential determination and an electric current determination. As previously indicated, the alert section may be constructed of a position differential determination only.

When the position differential exceeds the first threshold and/or the electric current exceeds the second threshold, temperature adhesion is indicated, and the routine proceeds to step 53 where the alert device 71 indicates that a temperature adhesion has occurred. The control routine proceeds to step 54 where a suitable separation method is selected from the control routines (control routines of FIGS. 10, 11, 13, 15, 17) stored in the RAM of the control unit 7, and the selected routine is thereafter conducted. At step 55, the control routine determines whether the temperature-adhered electrode tip has been separated from the workpiece. If the electrode is not separated from the workpiece, step 55 cycles the control routine back to step 54 until the electrode tip is separated from the workpiece. When the electrode tip 3 is separated from the workpiece, the routine proceeds to step 56 wherein completion of the welding process is verified. The steps 54 and 55 correspond to the separation method selection and control section 72e.

At step 52, if either the positional differential or the electric current does not exceed its corresponding threshold, the routine proceeds to step 56, where the control routine determines whether the spot welding has been finished and the pressure released. If the pressure has not been released, the routine goes back to step 51 and the cycle is repeated. In contrast, when welding has been finished and the pressure released, the cycle ends, and the welding gun 2 is moved by the welding robot 1 to the next spot welding point.

Figure 10:
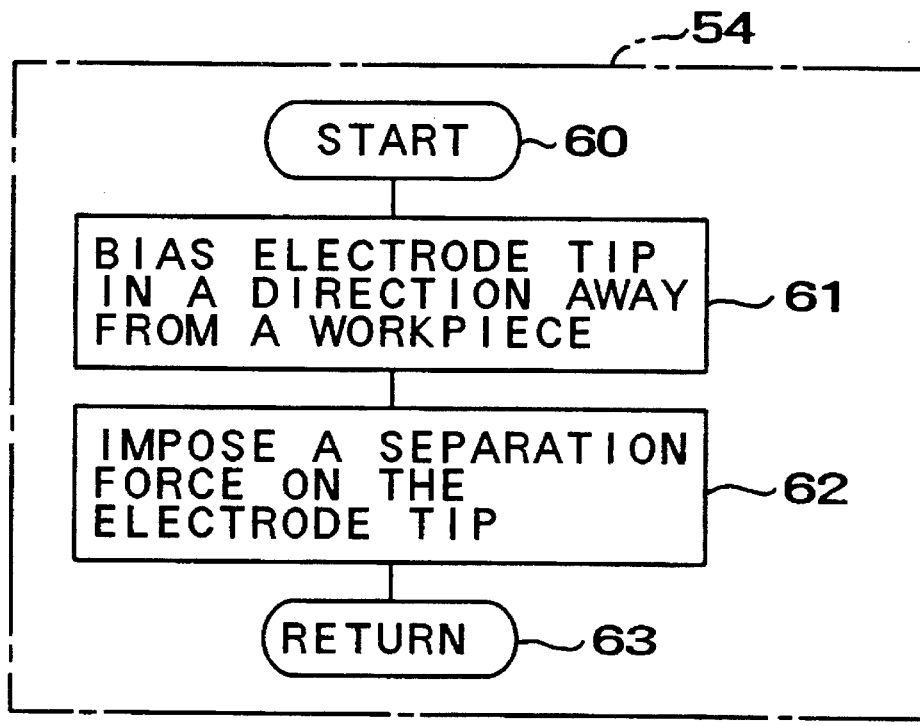
FIG. 10 is a flow chart of a general routine for selecting and conducting a temperature-adhered electrode tip separating method, applicable to any embodiment of the present invention.

The separation method selection and control step 54 is generally indicated in FIG. 10. At step 61, the electrode tip 3 is biased perpendicularly away from the workpiece 6 by operating at least one of the robot servo motors 16 or the welding gun servo motor. The biasing method changes according to respective embodiments of the present invention. Then, at step 62, a separation force is imposed to the temperature-adhered electrode tip 3 while the tip 3 is being biased in the direction away from the workpiece 6 so that the electrode tip 3 is separated from the workpiece 6. The method for imposing separation forces changes according to respective embodiments of the present invention. The separation force may be a manually imposed hammering force or a mechanically imposed force. In the case of a mechanically imposed force, the separation can be automatic. Finally, the routine proceeds to step 63 where the routine returns to step 55 of FIG. 9.

In the present invention, since the temperature-adhered electrode tip 3 is biased in the direction away from the workpiece 6, the workpiece 6 will not be injured by the electrode tip 3 even if either the electrode tip 3 or the workpiece 6 is laterally moved relative to the other during and/or after the separation.

Structures and operation thereof unique to respective embodiments of the present invention will now be explained.

Figure 11:
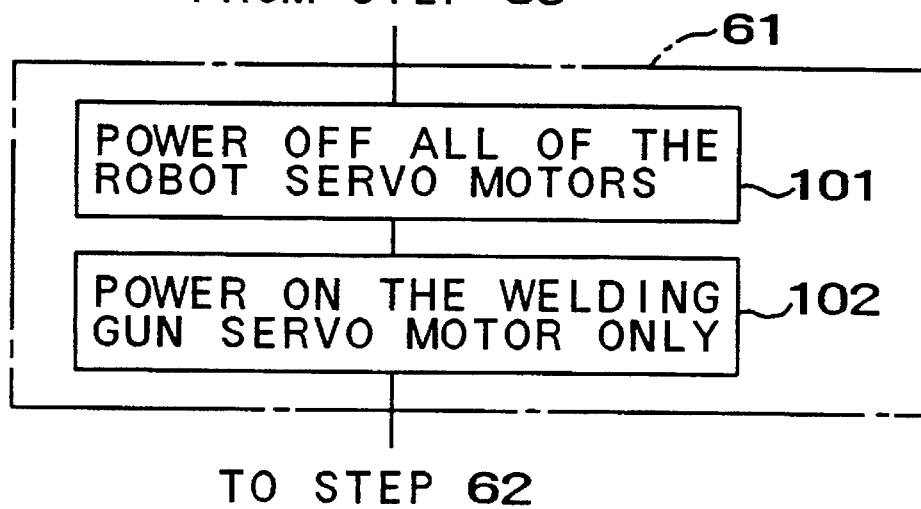
FIG. 11 is a partial flow chart of a control routine for separating an electrode tip from a workpiece when the electrode tip has temperature adhered to the workpiece in accordance with a first embodiment of the present invention.

With a first embodiment of the present invention, the electrode tip 3 is biased as described in FIG. 11. More particularly, at step 101, all of the robot servo motors 16 are powered off. When a worker enters the robot area, the welding gun servo motor 26 and all of the robot servo motors 16 are automatically powered off thereby preventing the worker from being hit by the robot. So, in a case where the worker enters the robot area to manually hammer the temperature-adhered portion, step 101 will be automatically conducted. Then, the routine proceeds to step 102 where the welding gun servo motor 26 only is powered on, either manually or automatically, to bias the electrode tip 3 in the direction away from the workpiece 6. Since the robot 1 is stopped and only the electrode tip 3 is biased in the direction perpendicular to the workpiece 6, the worker is protected from being hit by the robot 1. Then, the routine proceeds to step 62 of FIG. 10—execution of the separation force.

Figure 12:
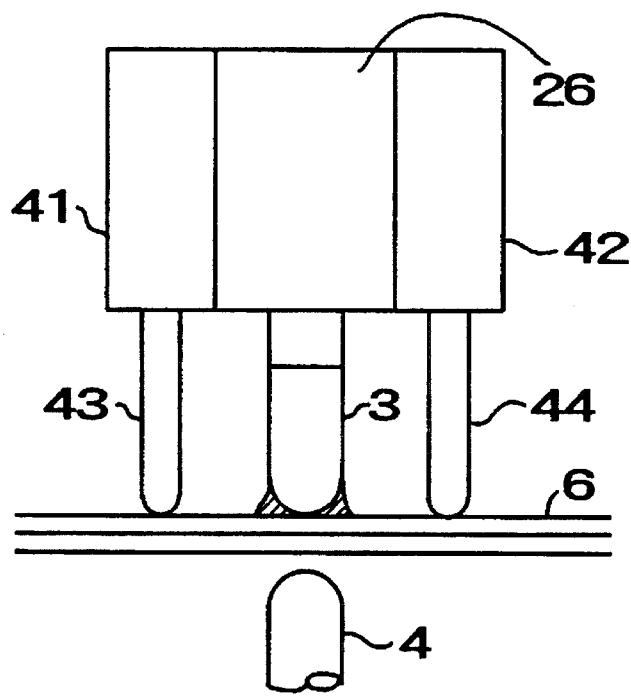
FIG. 12 is a schematic elevational view of an apparatus for separating the electrode tip from the workpiece when the electrode tip has adhered to the workpiece in accordance with the first embodiment of the present invention.

At step 62, a separation force is imposed on the adhering portion by, for example, hammering the temperature-adhered electrode tip 3 so that the electrode tip 3 is separated from the workpiece 6. Additionally, the separation force of step 62 may be mechanically imposed, as illustrated in FIG. 12. Rods 43 and 44 of equalizing mechanisms 41 and 44 are moved toward the workpiece 6 thereby pushing and separating the workpiece 6 from the electrode tip 3. When the separation force is mechanically imposed, the separation can be automatic.

Figure 13:
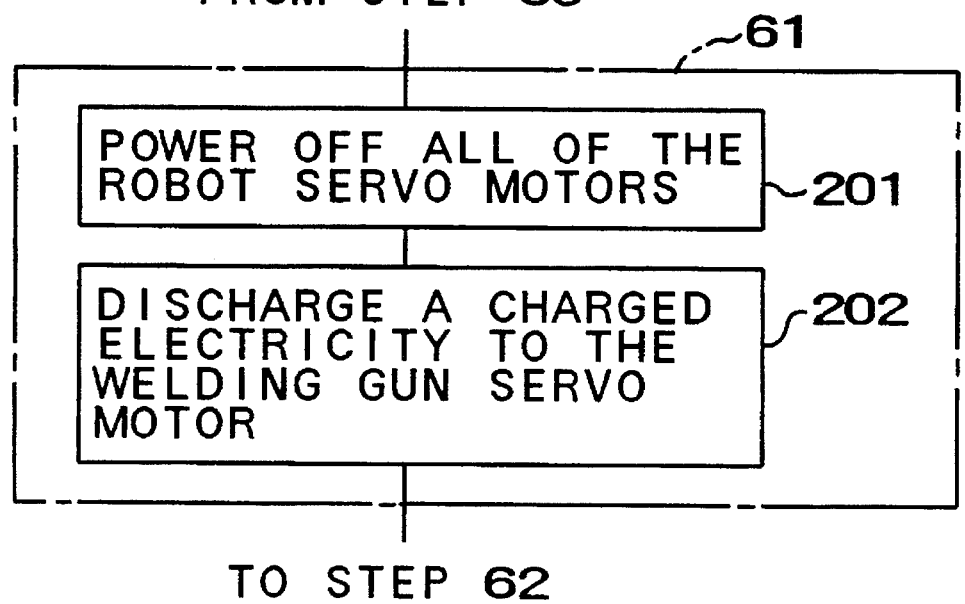
FIG. 13 is a partial flow chart of a control routine for separating an electrode tip from a workpiece when the electrode tip has temperature adhered to the workpiece in accordance with a second embodiment of the present invention.
Figure 14:
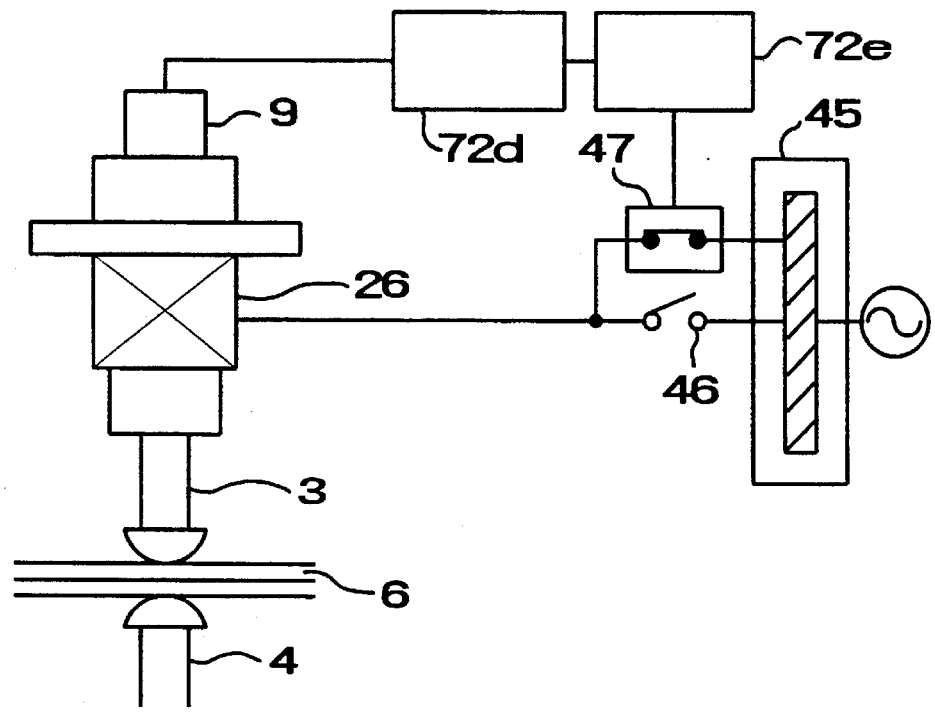
FIG. 14 is a schematic elevational view of an apparatus and an electric circuit for separating the electrode tip from the workpiece when the electrode tip has temperature adhered to the workpiece in accordance with the second embodiment of the present invention.

With a second embodiment of the present invention, the electrode tip 3 is biased as described in FIG. 13 and illustrated in FIG. 14. More particularly, at step 201, all of the robot servo motors 16 are powered off. Then, the routine proceeds to step 202 where a condenser battery 45 is discharged to the welding gun servo motor 26 (A.C. motor). Consequently, windings of the A.C. motor 26 are energized and the electrode tip 3 is biased in the direction away from the workpiece 6. The steps 201 and 202 correspond to step 61 of FIG. 10. Then, the routine proceeds to step 62 of FIG. 10 where the separation force is manually or mechanically imposed on the adhering portion. The separation force may be a hammering force manually imposed or a mechanical force automatically imposed as illustrated, for example, in FIG. 12. Further, the separation force may include the bias generated in the motor 26 by the discharged electricity. Moreover, if the electrode tip 3 is oscillated by increasing a gain during discharge, the separation will be easier.

FIG. 14 illustrates the condenser battery 45 disposed in an electrical power circuit of the welding gun servo motor 26. When the worker enters the robot area, the robot servo motors 16 are powered off and a switch 46 of the welding gun servo motor 26 is automatically opened. At the same time, at step 202, a switch 47 bypassing the switch 46 is closed so that the condenser battery 45 is discharged via the switch 47 to the welding gun servo motor 26. Since discharged electric current is transitory, the welding gun servo motor 26 does not continue to rotate. A torque to rotate the servo motor 26, however, develops to sufficiently bias the electrode tip 3 in a direction away from the workpiece 6.

Figure 15:
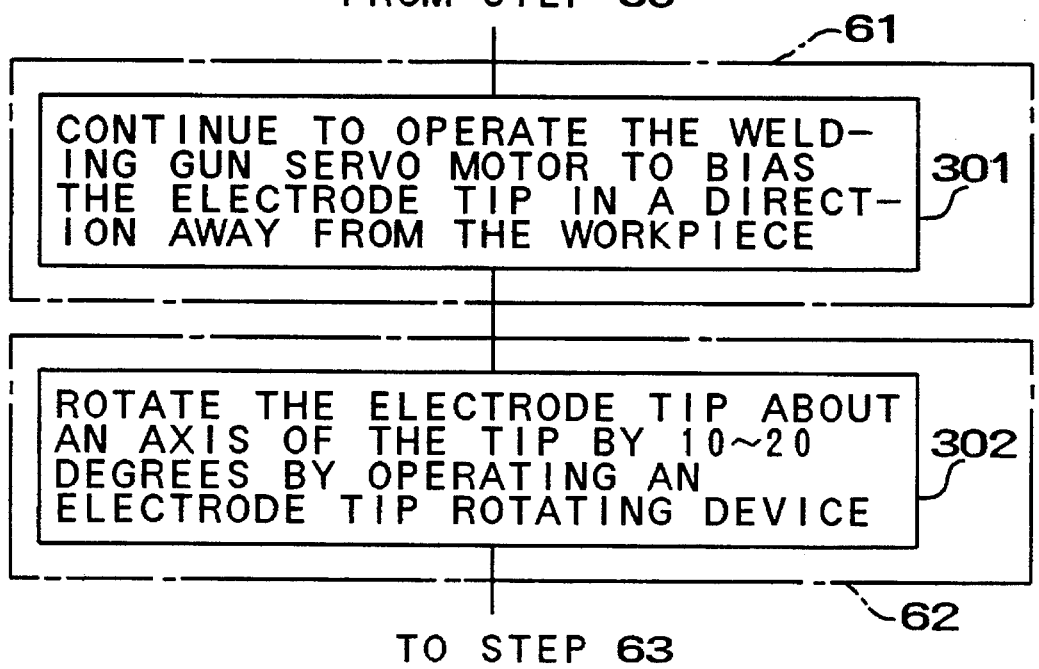
FIG. 15 is a partial flow chart of a control routine for separating an electrode tip from a workpiece when the electrode tip has temperature adhered to the workpiece in accordance with a third embodiment of the present invention.

With a third embodiment of the present invention, as described in FIG. 15, the electrode tip 3 is biased in a direction away from the workpiece 6 and is separated automatically from the workpiece 6. In the case of automatic separation, the robot servo motor 16 and the welding gun servo motor 26 are not powered off for safety because a worker does not need to enter the robot area. At step 301, the welding gun servo motor 26 is operated continually so that the electrode tip 3 is biased in a direction away from the workpiece 6. Step 301 corresponds to step 61 of FIG. 10. Then, the routine proceeds to step 302 where the electrode tip 3 is rotated by about ten to twenty degrees about an axis of the electrode tip 3 by operating an electrode tip rotating device 30. In this embodiment, the separation force includes the rotational force generated by the electrode tip rotating device 30. The rotational force is preferable over a lateral force such as a hammering force because defect are less likely to be generated in the workpiece 6. The step 302 corresponds to, step 62 of FIG. 10.

Figure 16:
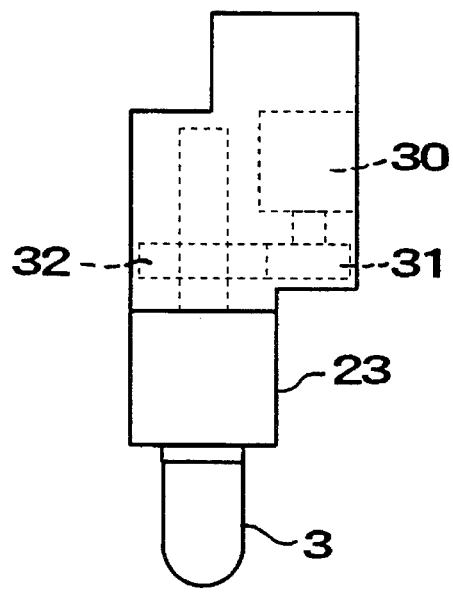
FIG. 16 is a schematic elevational view of an apparatus for separating the electrode tip from the workpiece when the electrode tip has temperature adhered to the workpiece in accordance with the third embodiment of the present invention.

FIG. 16 illustrates the electrode tip rotating device 30 which includes an electrical motor. The rotational torque of the motor is transmitted to the tip holder 23 through engagement of gears 31 and 32.

Figure 17:
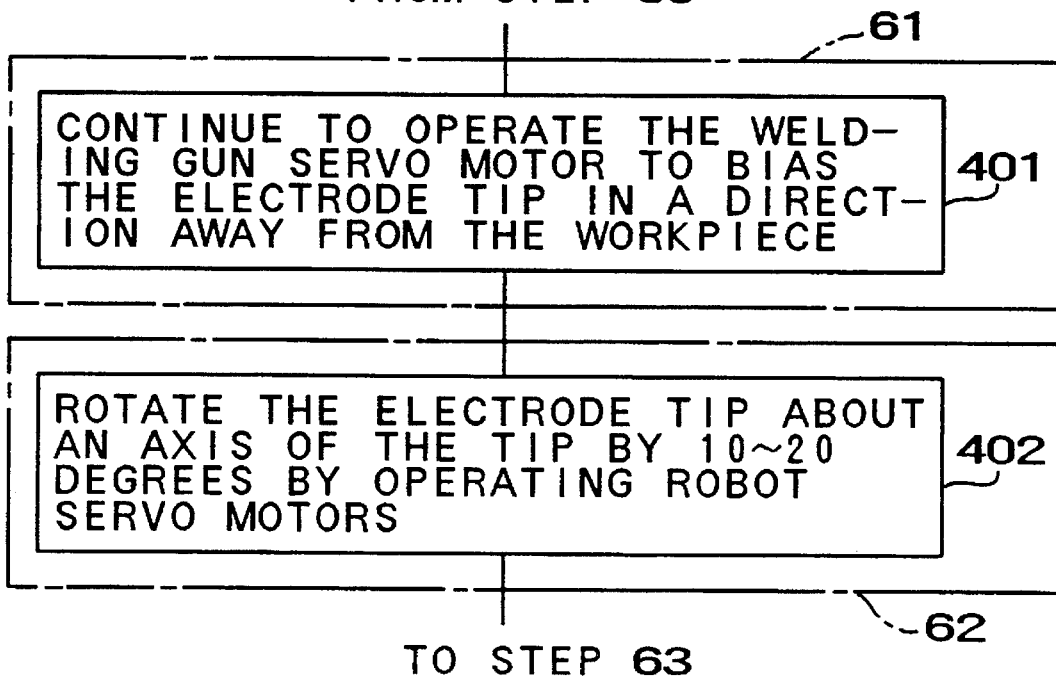
FIG. 17 is a partial flow chart of a control routine for separating an electrode tip from a workpiece when the electrode tip has temperature adhered to the workpiece in accordance with a fourth embodiment of the present invention.

With a fourth embodiment of the present invention, as described in FIG. 17, the electrode tip 3 is biased in a direction away from the workpiece 6 and is separated automatically from the workpiece 6. In the case of automatic separation, the robot servo motor 16 and the welding gun servo motor 26 are not powered off for safety because a worker does not need to enter the robot area. At step 401, the welding gun servo motor 26 is operated continually so that the electrode tip 3 is biased in a direction away from the workpiece 6. Step 401 corresponds to step 61 of FIG. 10. Then, the routine proceeds to step 402 where the electrode tip 3 is rotated by about ten to twenty degrees about an axis of the electrode tip 3 by operating all of the robot servo motors 16. In this embodiment, the separation force includes the rotational force generated by the robot servo motors 16. The rotational force is preferable over a lateral force such as a hammering force because defects are less likely to be generated in the workpiece 6. The step 402 corresponds to step 62 of FIG. 10.

Figure 18:
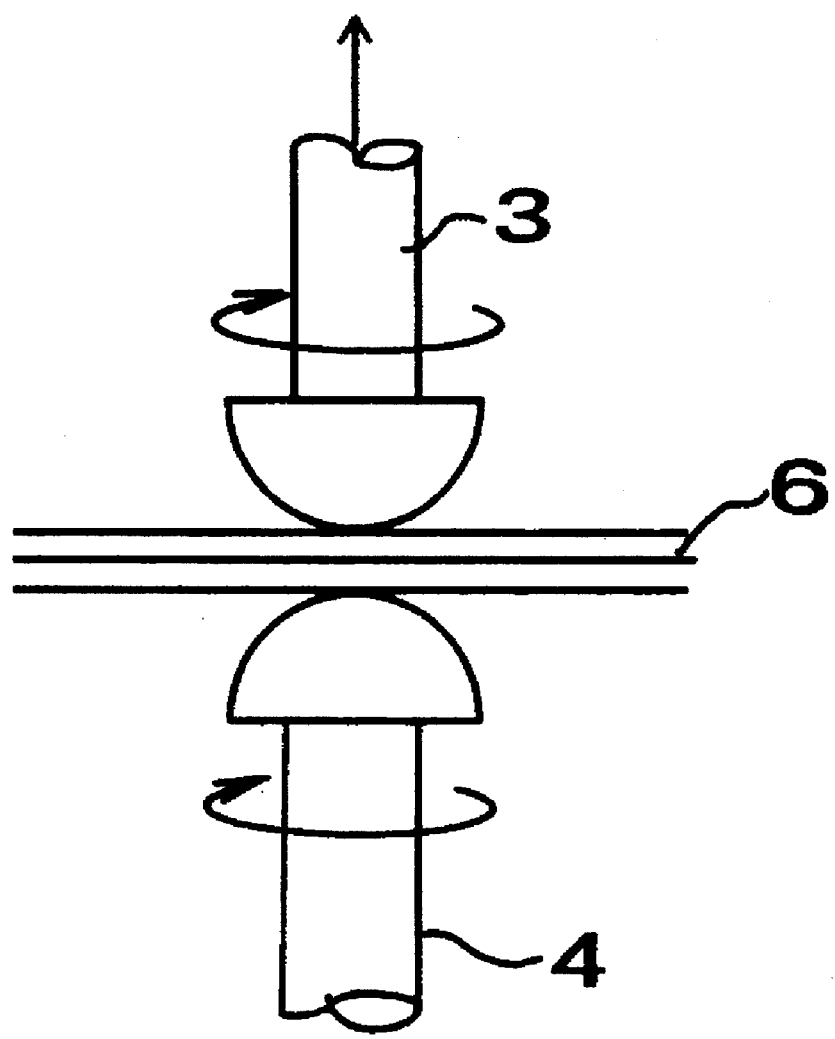
FIG. 18 is a schematic elevational view of an electrode tip and members in the vicinity thereof showing movement in directions indicated by arrows in accordance with the fourth embodiment of the present invention.

FIG. 18 illustrates the biasing force and the rotational force acting on the electrode tip 3. The biasing force is generated by the welding gun servo motor 26 at step 401, and the rotational force is generated by the robot servo motors 16 at step 402. The rotational force has to be imposed on the electrode tip 3 while the biasing force is being imposed on the electrode tip 3.

In the above-described embodiments, though only one of the electrode tips 3 and 4 is driven by the welding gun servo motor 26, both electrode tips 3 and 4 may be driven by respective welding gun servo motors.

According to any embodiment of the present invention, since the electrode tip 3 is biased in a direction away from the workpiece 6, a defect will not be caused in the workpice 6 when either the electrode tip 3 or the workpiece 6 is moved relative to the other during and/or after separation.

Although only four embodiments of the present invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the invention as defined by the following claims.

What is claimed is:

1. A method for separating a workpiece from a welding electrode tip adhered to the workpiece by the solidification of a softened portion of the workpiece onto the electrode tip following welding, wherein a welding gun is moved by a welding robot having six articulations driven by respective robot servo motors and the welding gun has a pair of electrode tips including the adhered electrode tip, at least one of which is driven by a welding gun servo motor, and wherein a condenser battery is connected electrically to the welding gun servo motor, said method comprising:

biasing the adhered electrode tip in a direction away from and perpendicular to the workpiece by discharging the condenser battery to the welding gun servo motor while all of the robot servo motors and the welding gun servo motor are powered off to bias the electrode tip in a direction away from the workpiece; and imposing a separation force on the adhered electrode tip while the adhered electrode tip is being biased in the direction away from the workpiece, to separate the adhered electrode tip from the workpiece.

2. An apparatus for separating a workpiece from a welding electrode tip adhered to the workpiece by the solidification of a softened portion of the workpiece onto the electrode tip following welding wherein a welding gun is moved by a welding robot having six articulations driven by respective robot servo motors and the welding gun has a pair of electrode tips including the adhered electrode tip, at least one of which is driven by a welding gun servo motor, said apparatus comprising:

a condenser battery installed in an electric circuit including the welding gun servo motor, the condenser battery being adapted to discharge to the welding gun servo motor upon receiving a temperature adhesion occurrence signal to bias the adhered electrode tip adhering to the workpiece in a direction away from the workpiece.

3. An apparatus for separating a workpiece from a welding electrode tip adhered to the workpiece by the solidification of a softened portion of the workpiece onto the electrode tip following welding, wherein a welding gun is moved by a welding robot having six articulations driven by respective robot servo motors and the welding gun has a pair of electrode tips including the adhered electrode tip, at least one of which is driven by a welding gun servo motor, said apparatus comprising:

an electrode tip rotating device installed to the welding gun for rotating said at least one electrode tip driven by the welding gun servo motor about an axis of the electrode tip.

4. A method for separating a workpiece from a welding electrode tip adhered to the workpiece by the solidification of a softened portion of the workpiece onto the electrode tip following welding, wherein a welding gun is moved by a welding robot having six articulations driven by respective robot servo motors and the welding gun has a pair of electrode tips including the adhered electrode tip, at least one of which is driven by a welding gun servo motor, said method comprising:

biasing the adhered electrode tip in a direction away from and perpendicular to the workpiece by operating at least one of the robot servo motors and the welding gun servo motor; and imposing a separation force on the adhered electrode tip while the adhered electrode tip is being biased in the direction away from the workpiece to separate the adhered electrode tip from the workpiece, the separation force including a rotational force to bias the adhered electrode tip in a rotating direction about an axis of the electrode tip.

5. A method according to claim 4, wherein the welding gun further includes an electrode tip rotating device for rotating said at least one electrode tip driven by the welding gun servo motor about the axis of the electrode tip, and wherein said rotational force of the separation force includes a rotational force generated by the welding tip rotating device.

6. A method according to claim 4, wherein said rotating force of the separation force includes a rotational force generated by all of the robot servo motors.

7. A method according to claim 4 wherein during said biasing step, all of the robot servo motors are powered off and only the welding gun servo motor is powered on.

* * * * *